Figure 1:
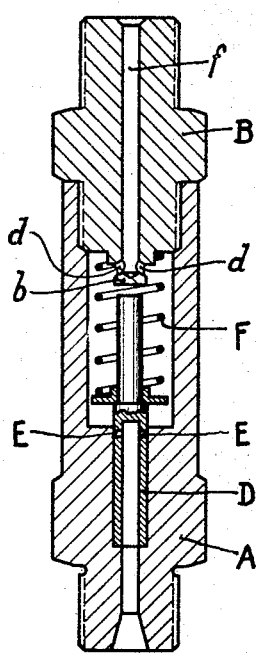

Aug. 17, 1937.   H. HEINRICH ET AL   2,090,350
INJECTION INTERNAL COMBUSTION ENGINE
Filed Jan. 7, 1935

Inventors
Hans Heinrich
Willy Voit
by Stewart & McKay
their attorneys

Patented Aug. 17, 1937

2,090,350

UNITED STATES PATENT OFFICE 2,090,350

INJECTION INTERNAL COMBUSTION ENGINE

Hans Heinrich, Stuttgart, and Willy Voit, Stuttgart-Bad Cannstatt, Germany, assignors to Robert Bosch Aktiengesellschaft, Stuttgart, Germany Application January 7, 1935, Serial No. 744
In Germany January 11, 1934

2 Claims. (Cl. 123—32)

The present invention relates to injection internal combustion engines.

In Diesel engines it has been found that the duration of the injection preferably does not alter in the same ratio as the amount injected. If, especially when running light or even when accelerating, that part of the fuel first injected is injected within a space of time which, corresponding to the ratio of the fuel amounts, is shorter than the time for the injection of the fuel under full load, the engine runs hard or knocks. This drawback disappears if, according to the invention, the duration of injection—and namely only for the first part of the total quantity injected—is extended, say, beyond the period of ignition delay, that is, beyond the period elapsing from the moment the injection of fuel out of the nozzle begins to the moment the ignition or combustion also begins.

The invention consists in that a device is introduced between the injection pump and injection nozzle of a plant for injecting fuel into internal combustion engines, which automatically causes the ratio of the amount of fuel injected to the duration of injection to be substantially smaller, at least for the first part of a full charge to be injected, than for the rest of a charge. Preferably, this proportion is so chosen that with the ignition delay existing for the actual conditions no severe combustion explosions can occur.

In order that the device inserted between the pump and nozzle may govern the injection operation, it must represent and, indeed, controllably, the point of greatest resistance in the fuel stream beyond the pump; generally therefore it will have to form, at least during the braked injection, the narrowest point for the passage of the fuel stream.

The usual liquid-controlled, spring-loaded injection nozzle has the tendency to open fully at once, as soon as its needle is raised from its seat, because then the needle surface presented to the pressure of the fuel is substantially increased compared with the surface presented by the needle when on its seat. This quick lift is one of the main reasons why the amount of fuel injected up to the end of the ignition delay is too great relative to its injection period and thus the duration of injection of this partial amount cannot be extended to such an extent as would be desirable for quiet running. The device inserted between the pump and nozzle during the time in which the ratio of the amount injected to the duration of injection is to be kept small must therefore introduce a resistance, for instance a strongly throttling cross-section, in the fuel pipe, which is automatically enlarged as soon as that ratio is to be increased.

Two examples of construction of the invention are shown in the accompanying drawing, in which:—

Figure 1 shows the first example in a longitudinal section through the device inserted between the injection pump and injection nozzle.

Figure 2:
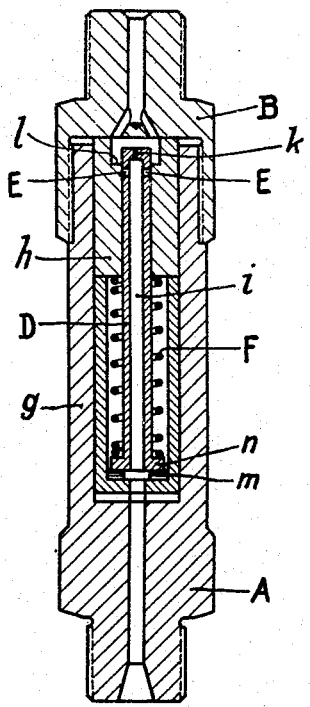

Figure 2 a similar view of the second example and

Figure 3:
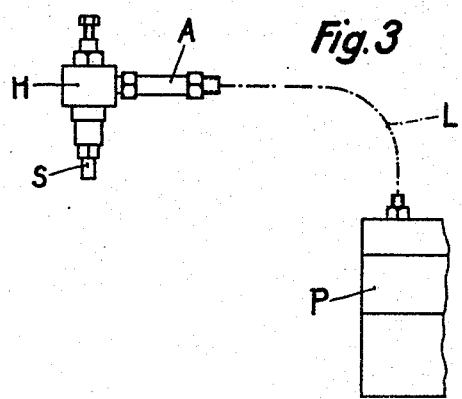

Figure 3 is a sketch of an injection apparatus having a device in accordance with the invention.

A longitudinally bored pipe union A can be closed with a screwed plug B and so forms the casing of the device. A pin D is mounted opposite the plug B so as to be a close fit but easily displaceable. In the part sliding in the union A this pin has a blind hole, which ends in two transverse holes E; these holes E are covered when the pin is seated in the bottom of the bore that guides it in the pipe union A. Beyond the end of the blind hole the pin D is somewhat reduced, and on the shoulder so formed carries a plate for a compression spring F, the other end of which bears against the plug B. This plug has opposite the end of the pin D a small pin b, which forms a stop for the pin D. The pin b, has two oblique holes d which open into a blind hole f traversing the plug for almost its whole length.

In Figure 3, P represents an injection pump and S an injection nozzle connected with it by the pipe L shown in chain-lines. Into the holder H of the nozzle S the plug B is screwed with the threaded end shown in Figure 1. The pipe L is connected to the threaded end of the union shown in Figure 1.

This device works in such a way that, on the correct tuning of the initial compression and the stiffness or characteristic of the spring F relative to the rest of the factors influencing the injection operation,—compression and curve of the nozzle needle spring, course of pressure and delivery amounts in the pump, amount of fuel before and behind the device and elasticity of the fuel including the elasticity of the pipe,—the pin D is at first only raised a little and the cross holes E—E emerge only a little from the guide part of the pipe union A. The cross-section opened in this first part of the movement of the pin is the narrowest point in the whole path of the fuel, and as it offers therefore the greatest resistance to the flow of fuel, the quantity passing into the space between the throttling device and the nozzle is less than the portion of fuel delivered up to this time by the pump. The portion of delivered fuel which has not yet been forced through the said narrowest point accumulates in the much longer part of the pressure pipe or conduit lying between the throttling device and the pump until the smaller portion of fuel which had previously passed through the throttling device is injected through the nozzle, and the pressure in that part of the fuel line between the throttling device and the nozzle has consequently dropped. After this, the pressure of the fuel between the throttling device and the pump is able to raise the pin D very quickly. Thereby a considerably wider passage for the flow of fuel through the valve is provided through which the portion of the fuel previously accumulated as well as the fuel delivered later on by the pump is released to the nozzle with negligible resistance.

It is not absolutely necessary for the cross holes E—E to be quite covered in the condition of repose of the apparatus; they may then stand open to a small amount which suffices for that mutual adjustment of the previously mentioned factors to be carried out by which the ratio of the amount injected to injection period is adjusted to its lower value for the smallest amounts of fuel to be passed through. Such a permanently open minimum passage may also of course be arranged in a different form, as shown for instance in Figure 2.

In this case, in the bore of the pipe union A a bush $g$ and a guide $h$ for the pin D formed as a piston-valve are inserted, which are secured in their position by the nipple B. The pin D has a cross hole E near its end adjacent the nipple. A non-throttling longitudinal bore $i$ in the pin D connects the supply connected to the union A with the cross hole. A fine throttle hole $k$ in the pin D representing the narrowest cross-section in the fuel stream connects the cross hole and thus the inflow constantly with the outflow to the nozzle connected to the nipple B. The mouths of the cross hole in the wall of the pin only emerge from the guide in the part $h$ after a certain amount of movement. The position of repose of the cross hole to the controlling edge L of the guide can be altered by inserting thin discs $m$ between the flange $n$ on the pin D that acts as a plate for the spring F and a shoulder in the bush $g$. Also the compression of the spring may be adjusted to the desired degree by inserting such discs between the ends of the spring and their abutments or bearing surfaces.

Experiments have further shown that preferably the amount of fuel between the device and the nozzle should be small, at least substantially smaller than that between the device and the pump. The device will therefore not be located beyond the third of the pipe adjacent the nozzle, but preferably fitted directly on the nozzle holder, as shown by Figure 3.

We declare, that what we claim is:

1. Injection apparatus for internal combustion engines comprising a fuel pump, an injection nozzle, a casing, and a conduit connecting said pump, nozzle and casing whereby said casing discharges liquid fuel delivered thereto by said pump under pressure to said nozzle only, a valve in said casing movable through its opening stroke by the pressure of the liquid fuel supplied thereto, said valve and casing being located in said conduit at such a point relative to said pump and nozzle that less than one-third of the contents of said conduit between said pump and nozzle lies between said valve and said nozzle, said valve and casing being formed and cooperatively arranged to provide a throttling fuel discharge opening of increasing cross-sectional area for the discharge of fuel as the valve executes its opening stroke, said discharge opening during an initial part of the opening stroke of said valve being of less cross-sectional area than the cross-sectional area of the nozzle opening, and means operating on the valve so as to retard its opening movement to limit the fuel injection to a relatively small quantity through the major portion of the ignition delay period of the engine, said valve being controlled by the pressure of the fuel delivered thereto.

2. Injection apparatus for internal combustion engines comprising a fuel pump, an injection nozzle, a casing having one outlet only, and a conduit connecting said pump, nozzle and casing whereby said casing receives liquid fuel under pressure from said pump and delivers it through said outlet to said nozzle only, a valve in said casing movable through its opening stroke by the pressure of the liquid fuel, said casing and valve being located in said conduit at such a point relative to said pump and nozzle that less than one-third of the contents of said conduit between said pump and nozzle lie between said valve and said nozzle, said casing and valve being formed and cooperatively arranged to provide a restricted or throttled fuel discharge opening of less cross-sectional area than the cross-sectional area of the injection nozzle opening during an initial part of the opening stroke of said valve and then to provide a substantially increased fuel discharge opening throughout said remaining part of the opening stroke of said valve, and spring means resiliently opposing the opening stroke of said valve.

HANS HEINRICI.
WILLY VOIT.